Figure 1:
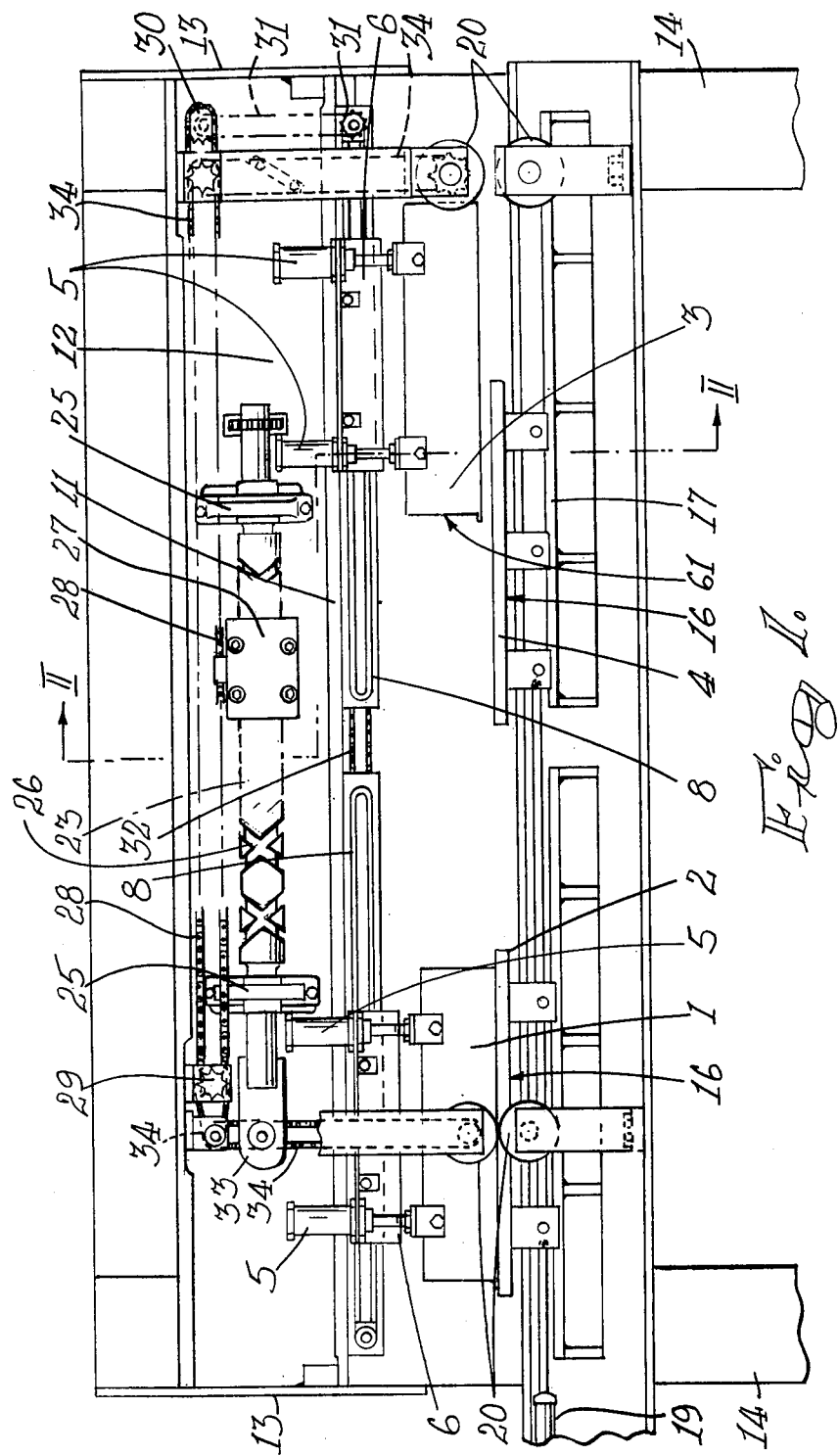

United States Patent [19]

Struve

[11] 4,091,254
[45] May 23, 1978

[54] APPARATUS FOR WELDING HEAT FUSIBLE MATERIAL

[75] Inventor: Friedrich Struve, Johannesburg, South Africa

[73] Assignee: Gundle Plastics (Proprietary) Limited, Edenvale, South Africa

[21] Appl. No.: 694,433

[22] Filed: Jun. 9, 1976

[30] Foreign Application Priority Data

Aug. 5, 1975 South Africa ............... 75/5040

[51] Int. Cl.² ............................................. B23K 11/08
[52] U.S. Cl. ................................. 219/79; 156/380; 219/10.53; 219/10.81; 219/118
[58] Field of Search ............. 219/79, 102, 91, 56, 219/87, 118, 10.81, 10.53; 156/380

[56] References Cited

U.S. PATENT DOCUMENTS

| 1,123,558 | 1/1915 | Lachman | 219/87 |
| 2,630,519 | 3/1953 | Gard | 219/10.81 X |
| 2,822,575 | 2/1958 | Imbert | 156/380 |
| 3,366,523 | 1/1968 | Weber | 156/380 |
| 3,497,659 | 2/1970 | Ritter | 219/56 |
| 3,585,709 | 6/1971 | Muller | 219/102 X |
| 3,612,816 | 10/1971 | Hand | 219/87 X |
| 3,684,612 | 8/1972 | Pantazis | 156/380 X |
| 3,699,756 | 10/1972 | Ritter | 219/56 |
| 3,716,689 | 2/1973 | Meenen | 219/10.81 X |

*Primary Examiner*—Elliot A. Goldberg
*Attorney, Agent, or Firm*—Cushman, Darby & Cushman

[57] ABSTRACT

This disclosure relates to the production of an ultimately continuous weld between sheets of heat fusible material using a welding apparatus which includes a supporting frame and at least one assembly of electrodes mounted on the frame and being movable between positions in which the electrodes are biased towards each other and positions in which they are disengaged from each other, the apparatus being characterized in that the electrodes are movable longitudinally in the frame together with material being welded thereby during each welding cycle and the movement of the electrodes between welding cycles is such that each individual weld at least abuts the adjacent welds after passage of the material through the apparatus.

10 Claims, 10 Drawing Figures

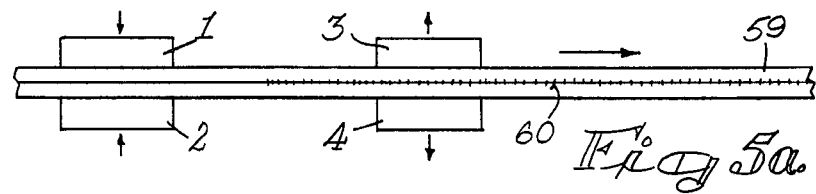
Fig 5a.
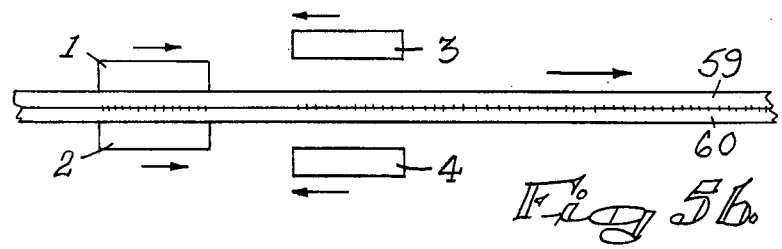
Fig 5b.
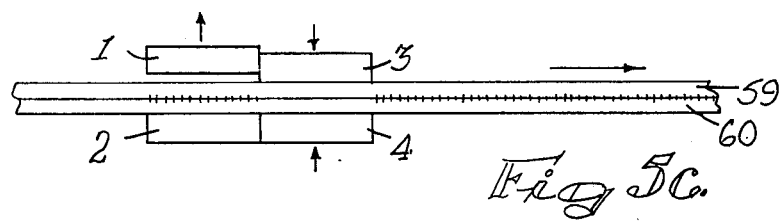
Fig 5c.
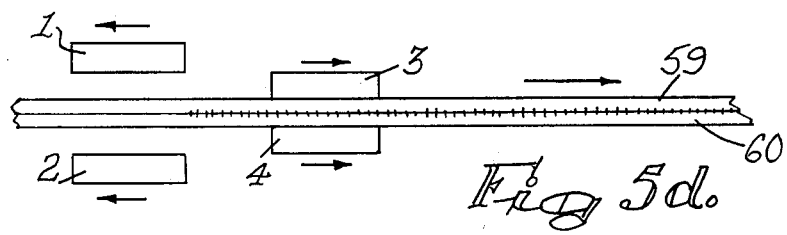
Fig 5d.
Fig 6.
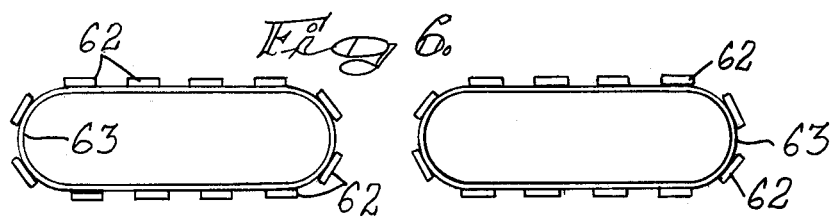
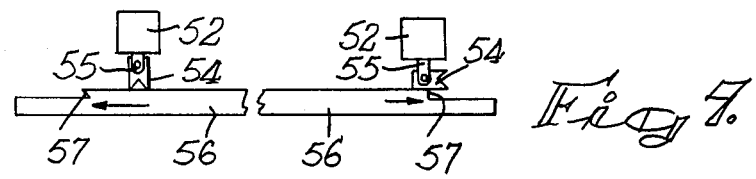
Fig 7.

APPARATUS FOR WELDING HEAT FUSIBLE MATERIAL

This invention relates primarily to the welding of plastics materials together and more particularly the invention relates to the welding of sheets of plastics material along substantially uninterrupted lines. The invention also, however, includes within its scope the welding of any other heat fusible sheet materials. Such welding processes include those carried out by induction heating, resistance heating, conduction heating and high frequency heating.

Where sheets of thermoplastic material to be welded are thin, a pair of rotating disc shaped electrodes has been found to operate successfully if the required welding and dwell times are sufficiently small. This arrangement does not operate with materials requiring appreciable weld and dwell times to achieve a satisfactory weld.

In the latter instance apparatus comprising a large drum having an electrode fixed at a position on its circumference has been used. A conductive belt holds the sheet material being welded against the surface of the drum over about a 90° section thereof. This apparatus is rather cumbersome and difficult to operate Other apparatus in which a hot wedge, or nozzle blowing hot air, is inserted between the two layers of material to be welded is also well known. In such apparatus the materials are pulled over the heating device and pressed together by nip rollers. Disadvantages of such apparatus include the possibility of burning the material, obtaining unwelded portions and degrading the material in the weld.

All other types of welding apparatus known to applicants have immovable electrodes operating on sheet material which is moved in a stepwise manner relative to the electrodes.

It is the object of this invention to provide apparatus for forming continuous welds between sheets of heat fusible material which is simple yet effective in operation and which enables, if required, the sheet material to be moved continuously.

In accordance with this invention there is provided welding apparatus for producing an ultimately continuous weld between sheets of heat fusible material, the apparatus comprising a supporting frame and at least one assembly of electrodes mounted on the frame and being positions in which the electrodes are biased towards each other and positions in which they are disengaged from each other, the apparatus being characterized in that the electrodes are movable longitudinally in the frame together with material being welded thereby during each welding cycle and the movement of the electrodes between welding cycles is such that each individual weld at least abuts the adjacent welds after passage of the material through the apparatus.

Further features of the invention provide for the apparatus to have feed rollers adapted to feed material through the apparatus at a constant but optionally adjustable speed; for there to be two or more assemblies of electrodes on the frame each of which is adapted to form a series of spaced welds with the final electrode assembly interconnecting the series of welds formed by the other electrode assemblies to provide a continuous weld and for the welding to be effected by known high frequency welding techniques.

The electrodes may be mechanically mounted to operate in any desired path of movement and the movement of a clamped pair of electrodes can provide the motive power for moving the sheets of heat fusible material through the apparatus. Preferably a synchronized feeding mechanism can be used allowing the material to move at constant velocity with a pair of electrodes accellerating to this velocity before being caused to clamp the materials therebetween. In such an instance chain drives from a common source of motive power are suitable to ensure that movement of the electrodes and feeding mechanism remain in sychronization.

Preferably, two pairs of electrodes are embodied in the apparatus wherein the two pairs are adapted to effect welding cycles alternately. To this end the electrodes are made to move towards and away from each other continuously with the electrode moving in a preselected direction effecting a welding cycle. This movement of the electrodes can conveniently be achieved by securing one electrode to one pass and the other electrode to the other pass of an endless chain made to reciprocate by any suitable mechanical means. Such means could be a nut assembly made to follow and endless thread or groove in a rotating shaft the thread changing hands at each end of the "stroke".

The invention, and one preferred embodiment thereof, using high frequency welding, will now be described with reference to the accompanying drawings in which:-

Figure 2:
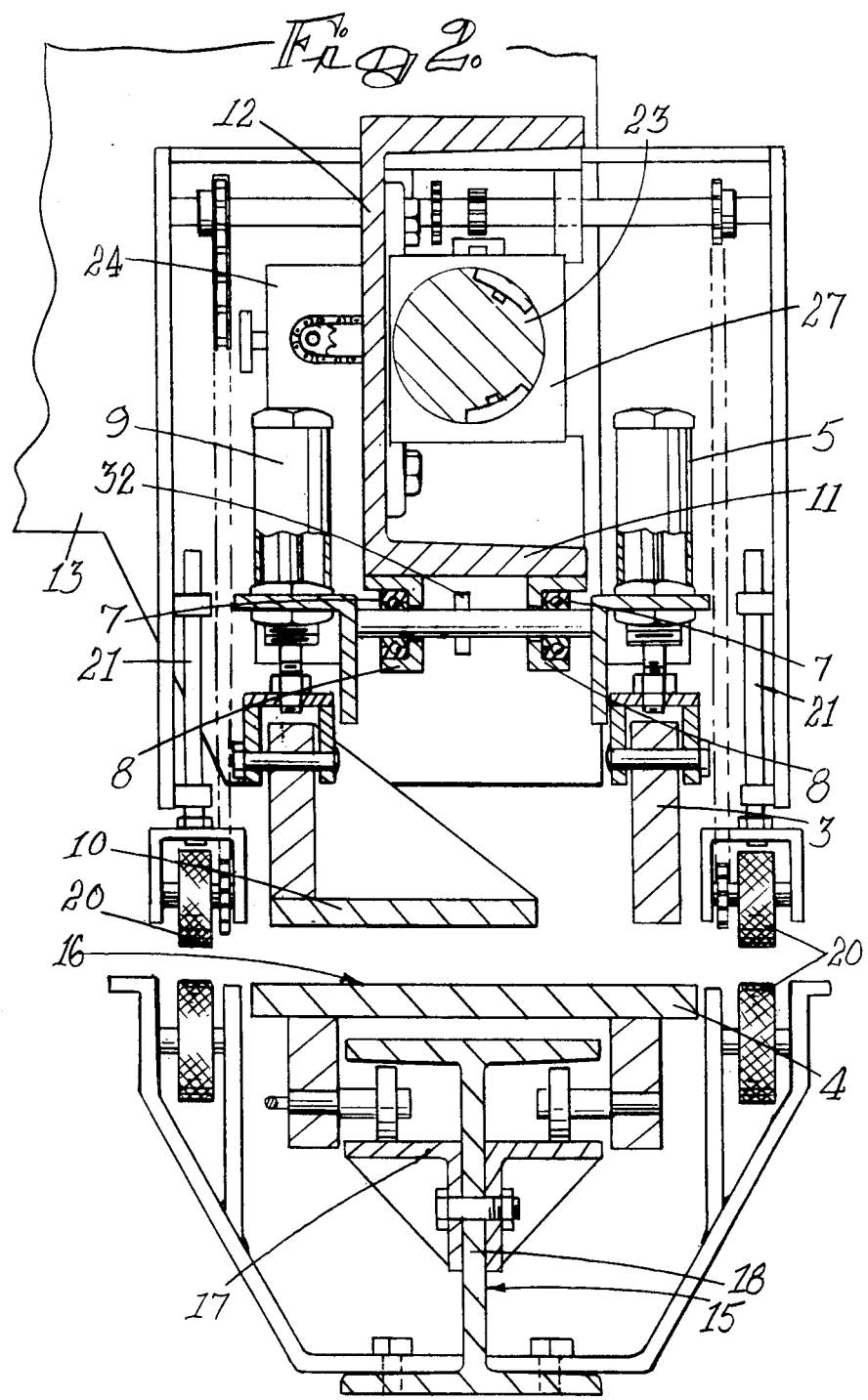
Figure 3:
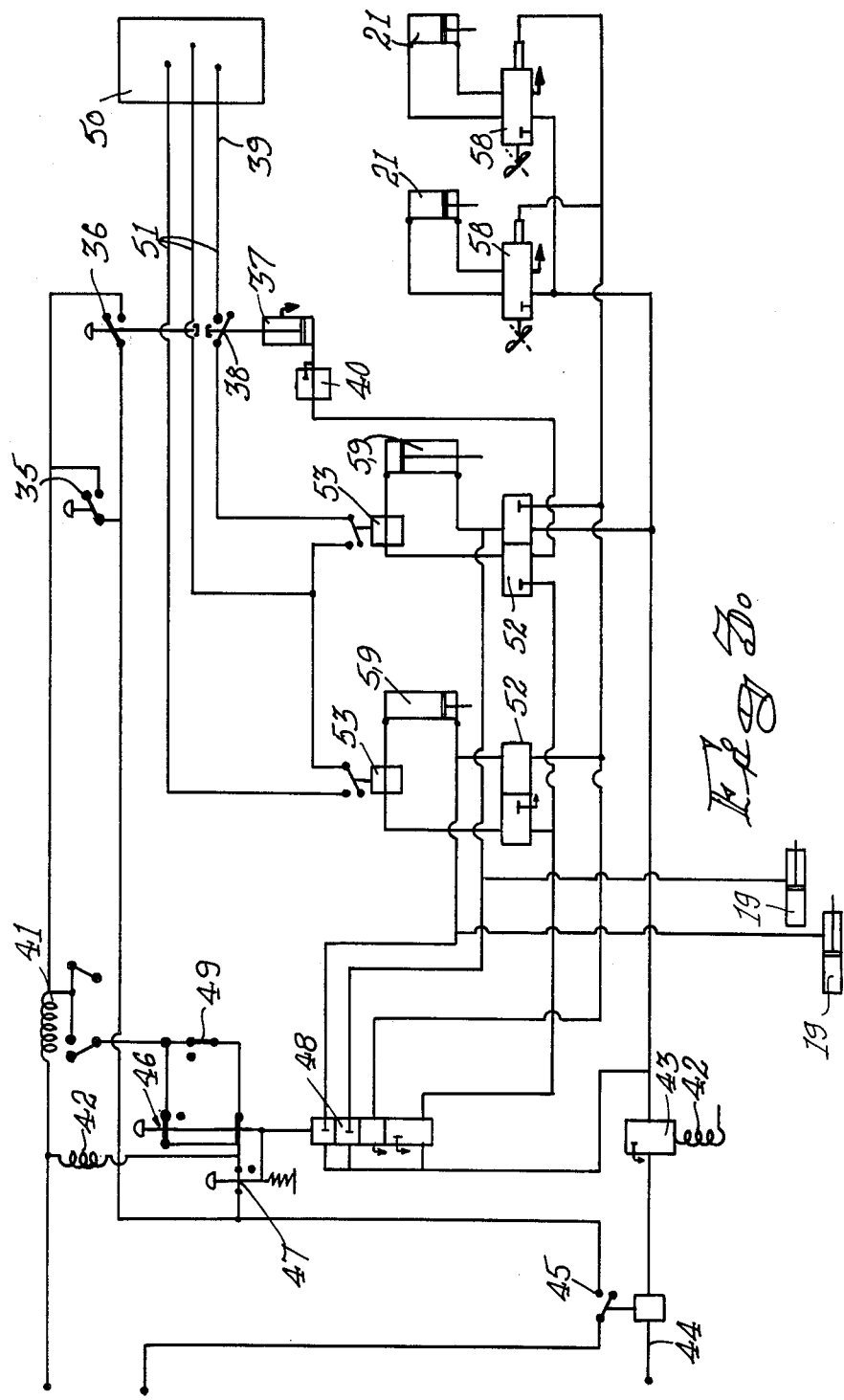
Figure 4:
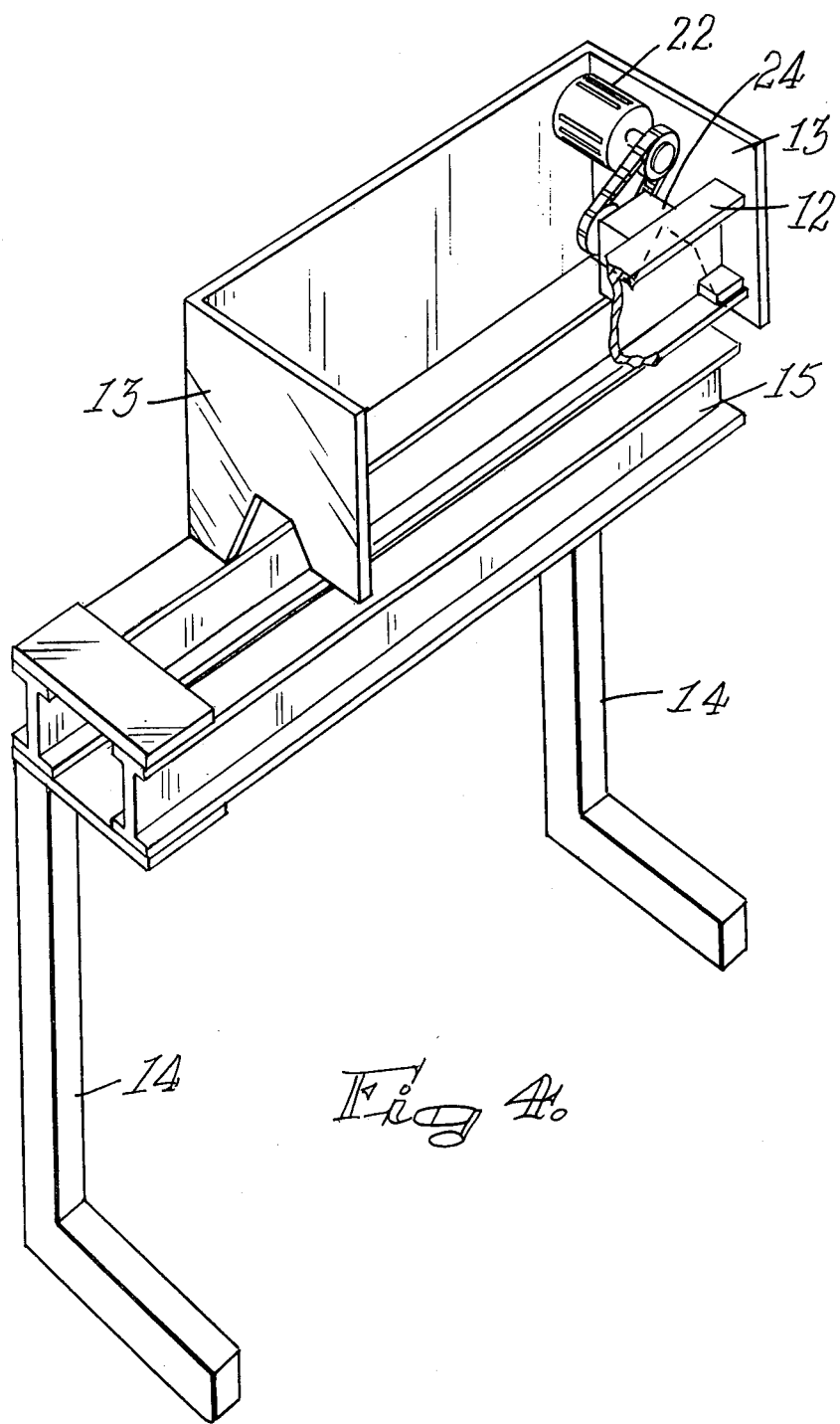

FIG. 1 is a front elevation of apparatus according to the invention with the front cover removed, FIG. 2 is a sectional view taken along line II—II in FIG. 1, FIG. 3 is a circuit diagram illustrating the pneumatic and electrical circuits of the apparatus, FIG. 4 is an isometric view of the frame alone, FIGS. 5a, 5b, 5c, 5d are schematic elevations illustrating four basic steps in the welding operation, FIG. 6 illustrates schematically how the invention may be extended to a large number of electrode pairs, and FIG. 7 illustrates in elevation a cam arrangement for operating the pneumatic valves controlling the pneumatic piston and cylinder assemblies.

Referring now to FIG. 1,2,3 and 4 the apparatus consists basically of two pairs of co-operating electrodes 1,2 and 3,4. The lower electrodes 2, 4 simply reciprocate along a straight line as will be apparent from the following description of the apparatus and its operation in use.

The upper electrodes are each mounted by way of pneumatic piston and cylinder assemblies 5 on a carrier 6 which in turn is supported by rollers 7 in guides 8 therefor. As far as longitudinal movement of the carriers is concerned, they are adapted to move towards and apart from each other at the same speed as will be described hereinafter.

Each carrier 6 further has fixed thereto laterally offset pneumatic piston and cylinder assemblies 9 which operate an earth electrode 10 in unison with the welding electrode 1,3. The earth electrode provides a return path for the high frequency current in known manner.

The guides 8 for the carriers are secured to the lower flange 11 of a robust channel member 12 located on its side and forming part of the frame of the apparatus. The channel member is secured between end plates 13 of the frame which is supported on legs 14 in this instance.

The frame also has a cantilever mounted I-beam 15 located directly beneath the channel member but spaced therefrom. A cantilever arrangement is used to enable tubes to be welded on the apparatus. The lower and passive electrodes 2,4 are in the form of plates 16 mounted on rollers supported on angles 17 secured to the web 18 of the I-beam. Thus the lower electrodes are free to move with the upper electrodes during a welding cycle but are each connected to separate pneumatic piston and cylinder assemblies 19 to move them back into a starting position for a subsequent welding cycle.

The plates 16 forming the lower electrodes are sufficiently wide to enable the earth electrodes 10 to have the required optimum area. This area is at present calculated as set out at p 251–253 of "HF SCHWEISS-TECHNIK" by G. F. ABELE and published by ZECHNER and HUTHIG VERLAG SPEYER 1965. This type of earth electrode is utilized due to difficulty experienced in following the longer return path from the lower electrode to the high frequency generator.

Towards each end of the channel member are two pairs of drive rollers 20 whereof one pair in each case in located on each side of the I-beam. The lower drive rollers which are freely rotatable are located such that their upper peripheries are roughly level with the upper surfaces of the lower electrodes. The upper drive rollers are movable vertically to engage and disengage same with sheet material this being achieved by means of four pneumatic piston and cylinder assemblies 21.

The motive power for the drive rollers is supplied from the same source as that for the upper electrodes which is derived as follows.

An electric motor 22 drives a drive shaft 23 through a suitable reduction gearbox 24, the drive shaft being mounted in bearings 25 to extend parallel to the channel member and within the latter. The drive shaft has an endless thread 26 cut with two oppositely handed, equal pitched threads or grooves interconnected towards the two ends of the shaft. A nut assembly 27 has followers co-operating with the threads or grooves such that it moves to and fro along the shaft as it rotates consistently in a single direction. Preferably the grooves have narrower grooves centrally therein and a sliding follower co-operates with the narrower groove and a bearing co-operates with the wider groove. This is not illustrated as it is considered to be simply normal mechanical design.

An endless chain 28 is secured to the nut assembly so that the chain reciprocates with the nut; the chain extends between two spaced sprockets 29, 30 on the frame. The one sprocket 30, through a shaft and further chain and sprocket assembly 31 transmits the drive downwardly to the level of the carriers and drives another endless chain 32 extending the length of the frame past the carriers. The one carrier is secured to one side of the latter chain whilst the other carrier is secured to the other side or pass of the chain. Thus as the chain moves in one or other direction the carriers will move towards or away from each other at the same speed. Adjustment of the relative positions of the carriers can easily be effected by altering the positions on the chain at which the carriers are fastened thereto.

The one end of the drive shaft, through a suitable angle drive 33 drives in a constant direction a further set of drive chains 34 which drive the feed rollers at equal and constant speeds. Slack on the chains 34 extending down to the feed rollers is taken up in the usual way by means of a biased arm (not shown) which deflects one pass of each of these chains outwardly.

The electrical and pneumatic circuits (see FIG. 3) of the apparatus will now be described. The electrical power supply to the apparatus is operable by both of two push button switches 35, 36 one 35 of which is simply adapted to close the required circuits and the other of which is adapted to cause the very first welding cycle of the second electrode pair to fail to operate. The latter is required when an "original" start is required on new lengths of material. The said other start button 36 is mechanically linked to a piston and cylinder 37 and a switch 38 in the high frequency supply line 39 to the second electrode assembly. In order to close the switch 38 the piston must be moved in its cylinder by exhaust air from the pistons 5, 9 associated with the second electrode assembly. Thus the second electrode assembly must have operated once prior to the switch 38 closing to allow the high frequency circuit to pass to the second electrode assembly. A relief valve 40 prevents the piston being moved against manual pressure when the button is pushed in the event that the second welding electrode is in a lowered condition at start up.

This circuit has a self holding relay 41 therein and includes a coil 42 of a pneumatic solenoid valve 43 in the main air supply line 44. The latter also has a normally open pressure operated switch 45 in series with the holding relay to prevent actuation of the apparatus when there is no pneumatic pressure.

The circuit is again opened by either of two stop switches 46, 47. The one switch 47 stops the machine instantly in its then position and is also ganged to a valve assembly 48. This switch 47 must be manually reset but on resetting the valve assembly 48 is not reset. The other switch 46 operates independantly and also operates the valve assembly 48 which causes immediate retraction of all pneumatic pistons 5, 9, 19 and 21 operating the electrodes and feed rollers. Operation of the switch 46 automatically causes the machine to return to a "start" position whereat a limit switch 49 is opened to stop the apparatus in that condition.

The electrical supply also activates a high frequency generator 50 having separate tuned co-axial cables 51 extending to the welding and earth electrodes. In this instance the high frequency generator is a 27,12 MG generator. Provision is made for tuning the generator according to the thickness of material being welded in known manner. Also, a timer is embodied in the generator to switch the current off after a predetermined weld time in the usual way.

The pneumatic pistons 5, 9 for the weld and earth electrodes are operated through valve assemblies 52 which either connect the tops of the cylinders to the compressed air supply or the bottoms. The opposite end of each cylinder is vented to atmosphere through the valve assembly. The top of each set of these cylinders (i.e. one set for the one electrode arrangement and one for the other) is connected to a pressure operated switch 53 which closes the appropriate high frequency supply when proper pressure exists in the upper regions of the cylinders. Thus welding only commences once proper pressure is exerted by the electrodes on the material being welded. The valve assemblies are operated by cam followers 54 (FIG. 7) carried by the operating rod 55 of the valve assembly and biased towards an elongated cam 56 secured to each carrier.

The cam followers have two positions relative to the cam, one in which the operating rod is depressed and one in which it is extended (see the left and right hand portions of FIG. 7 respectively). Movement of the cam follower between the two positions is effected by formations 57 in the cam itself. The cam and cam followers are designed to effect clamping and unclamping of the electrodes only whilst they are moving at the same speed as the material being welded.

The same valve assemblies activate the piston and cylinder assemblies 19 for retracting the lower passive electrodes 2, 4.

Finally, the clamping of the feed rollers is controlled by foot operated valve assemblies 58 which thus leaves an operator's hands free to arrange the material to be welded in the apparatus. Two such valve assemblies are provided, one of which operates the two feed rollers on one side of the electrodes, and the other operates the feed rollers on the opposite side thereof.

Operation of the apparatus will now be described with reference to FIGS. 5a, b, c and d as applied to the welding of sheets 59, 60 of thermoplastic material together.

Starting with the pairs of electrodes in the condition in which they are furthest from each other (FIG. 5a) the one pair 1,2 closes to grip the sheets of material therebetween whilst the other pair opens. In this condition the pairs of electrodes move toward each other as shown in FIG. 5b with the said one pair 1,2 effecting its welding cycle. When the pairs of electrodes are together the said one pair 1,2 opens and the other pair 3, 4 closes as shown in FIG. 5c after it has accelerated to the speed of the material being fed by the feed rollers. The two pairs of electrodes then move apart as shown in FIG. 5d.

The electrodes of the two pairs are of slightly different length and the longitudinal stroke of each is equal to the length of the shorter one 1,2. Thus a continuous weld will result with the second pair of electrodes welding the gaps left by the first pair with a slight overlap due to its longer length.

The movement of the electrodes is controlled so that the first pair unclamps prior to clamping of the second pair with the latter clamping over the end portion of the weld formed by the first pair. This is allowed by rebating the end of the second welding electrode 3 as shown clearly in FIG. 1 by numeral 61. Thus at the change over the lower end of the second electrode overlaps the end of the released first electrode 1.

It will be understood that numerous variations may be made to the above described embodiment of the invention without departing from the scope hereof. Thus the pneumatic arrangement could be made hydraulic or electrical and the welding method need not be high frequency welding. The number of electrodes could be varied and in fact a single moving electrode could be used. Whilst the latter simplifies control and apparatus it does require a more powerful welding apparatus. Also, feeding could be effected by the electrodes themselves.

As mentioned, the application of the invention may be broadened to any number of pairs of electrodes and in particular there may be two entire sets of electrodes. Such a situation is depicted in FIG. 6 where two sets of electrodes 62 are mounted on belts 63. In each case each electrode is arranged to weld an unwelded region in the same straight line (with optional overlapping of welds if required) so that after passage through the second set of electrodes a continuous weld results.

It will be understood that the mechanism for moving the electrodes may be varied as required as well as their method of mounting to the mechanism. Also, the invention is not confined in its scope to the welding of thermoplastic materials but could be applied to any induction, conduction, resistance or high frequency welding operations even as applied to sheet metal for example.

What I claim as new and desire to secure by Letters Patent is:

1. Welding apparatus for producing an ultimately continuous weld line between sheets of heat fusible material, said apparatus comprising a supporting frame, at least two pairs of welding electrodes, means for mounting each pair of said welding electrodes on said supporting frame, said mounting means including means for moving the electrodes of a said pair relative to each other between a clamping position and a disengaged position, each said mounting means being movable along a predetermined path on said supporting frame in a material advancing direction together with material being welded by said respective electrode pairs and in the opposite direction, means for moving the material to be welded along said paths in the material advancing direction with one pair of electrodes being in the clamping position and with the other of said pair in the disengaged position and moving in said opposite direction, means for activating each said pairs of electrodes to carry out a welding cycle while each said pair of electrodes is being moved in the material advancing direction along their respective paths, one pair of electrodes being located to form a series of collinear spaced line welds and the other pair being located to form line welds which join the said series to thereby from a continuous line weld.

2. Welding apparatus as claimed in claim 1 in which there are two or more assemblies of electrodes on the frame each of which is adapted to form a series of spaced welds with the final electrode assembly interconnecting the series of welds formed by the other electrode assembly to provide a continuous weld.

3. Welding apparatus as claimed in claim 1 in which there are two pairs of electrodes which move towards and away from each other at equal speeds.

4. Welding apparatus as claimed in claim 3 in which the welding electrode of each pair is carried on a carrier movable longitudinally on the frame and the carriers co-operate with mechanical means for effecting movement thereof.

5. Welding apparatus as claimed in claim 4 in which said mechanical means comprises an endless chain linked for reciprocating movement to a nut assembly co-operating with an endless thread on an axially rotatable shaft.

6. Welding apparatus as claimed in claim 1 in which the electrodes are biased towards each other and disengaged by means of fluid piston and cylinder assemblies operated by valve assemblies.

7. Welding apparatus as claimed in claim 6 in which the valve assemblies are operated by means of cams and cam followers, the former being associated with the movable electrodes.

8. Welding apparatus as claimed in claim 1 in which each electrode pair comprises an upper and a lower electrode, the lower electrode being freely movable with the upper electrode when engaged thereby and means for returning the lower electrodes to a starting position independently of the upper electrodes.

9. Welding apparatus as claimed in claim 1 wherein the electrodes are adapted to be high frequency operated.

10. Welding apparatus as claimed in claim 9 in which the electrode assembly comprises an upper, a lower electrode and a separate return electrode co-operable with the lower electrode.

* * * * *